3,064,055
PREPARATION OF 1,4-BIS(DIPHENYLPHOSPHINO) BENZENE

David L. Herring, Riverside, Calif., assignor to United States of America as represented by the Secretary of the Navy
No Drawing. Filed Apr. 19, 1962, Ser. No. 188,906
1 Claim. (Cl. 260—606.5)
(Granted under Title 35, U.S. Code (1952), sec. 266)

The invention herein described may be manufactured and used by or for the Government of the United States of America for governmental purposes without the payment of any royalties thereon or therefor.

The present invention relates to aryldiphosphines and more particularly to the preparation of 1,4-bis(diphenylphosphino)benzene.

The compound of the present invention is a valuable intermediate which is used in the preparation of polymeric materials; such polymeric materials being potentially useful dielectric materials. For example, the compound of the present invention reacts with 1,4-diazidobenzene according to the equation $(C_6H_5)_2PC_6H_4P(C_6H_5)_2 + N_3C_6H_4N_3 \rightarrow$
$[C_6H_4P(C_6H_5)_2NC_6H_4]_x + N_2$ The aryldiphosphines, such as the example cited in the above equation, will react with aryldiboranes to produce a new and potentially valuable family of polymeric materials:

$R_2PC_6H_4PR_2 + R'_2BC_6H_4BR'_2 \longrightarrow [R_2PC_6H_4\overset{R}{\underset{R}{P}}BR'_2C_6H_4BR_2]_x$ where R=alkyl, aryl, alkoxy, aryloxy and R'=halogen, hydrogen, alkyl, aryl, alkoxy or aryloxy. Since no small molecule is split out during the formation of [P—B] bonds this type of process is ideally suited to the requirements for high polymer formation. It may be used as a chelating agent or used to prepare chelate polymers.

This invention is related to copending application Serial No. 188,907 filed April 19, 1962, for Preparation of Polymeric Materials by the Reaction of Aryldiphosphines With Aryl Diazides, and copending application Serial No. 188,905 filed April 19, 1962 for the Preparation of Aryl Azides and Aryl Diazides by the Reaction of the Diazoniumtetrafloroborate Salt With Alkali Azides.

It is an object of the invention therefore to provide a new and useful compound as an intermediate in the preparation of polymeric materials.

It is another object of the invention to provide a new and useful composition of matter, 1,4-bis(diphenylphosphino)benzene.

A further object of the invention is to provide the synthesis of 1,4-bis(diphenylphosphino)benzene.

Other objects and many of the attendant advantages of this invention will become readily appreciated as the same becomes better understood by reference to the following detailed description.

The preparation of 1,4-bis(diphenylphosphino)benzene was effected in the following manner:

To 0.346 mole of N-$C_4H_9Li$, 0.14 mole of P-dibromobenzene in 400 ml. of n-hexane was added dropwise. The resulting mixture was then stirred at 60–65° C. for 48 hours yielding a cream-colored precipitate of p-dilithio benzene. When reaction periods of 24 hours are used, following the procedure used by H. Gilman et al., J. Am. Chem. Soc., 62 2327 (1940), only traces of p-dilithiobenzene can be detected and in most cases no p-dilithiobenzene can be detected at all. Then 0.36 mole of $(C_6H_5)_2PCl$ was added dropwise at room temperature over the course of 1 hour. The resulting mixture was heated at 60–65° for 3 hours then filtered at the boiling point. The hexane insoluble cream colored residue was extracted with 800 ml. of boiling benzene and again filtered. The excess benzene was removed by vacuum distillation yielding a residue of crude 1,4-bis(diphenylphosphino)benzene which was purified by vacuum sublimation. The pure, white crystalline solid product melted at 166–167° C. and was isolated in 20% yield.

*Analysis.*—Calcd. for $C_{30}H_{24}P_2$: C, 80.6; H, 5.4; P, 13.9; mol. wt., 446. Found: C, 80.6; H, 5.4; P, 13.8; mol. wt., 458 (Fp. of benzene).

This reaction will apply equally well to other diarylhalophosphines, for example, compounds such as

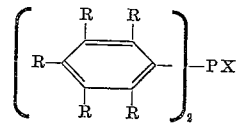

where R=H, alkyl, aryl and X=a halogen. This reaction will also apply to dialkylhalophosphines such as $(C_nH_{2n+1})_2PX$-$(C_nF_{2n+1})_2PK$ or alkylaryl such as

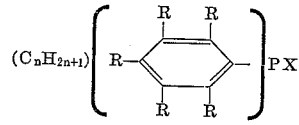

where $C_nH_{2n+1}$=alkyl; $C_nF_{2n+1}$=perfluoroalkyl+R=alkyl, H or aryl and X=a halogen.

This compound can probably also be prepared by one of the following reactions:

(1)
$(C_6H_5)_2PH + Li \xrightarrow[-40°C.]{THF} (C_6H_5)_2PLi$ $(C_6H_5)_2PLi + I\text{-}\!\!\!\bigcirc\!\!\!\text{-}I \longrightarrow (C_6H_5)_2PC_6H_4P(C_6H_5)_2$ (2)
$I\text{-}\!\!\!\bigcirc\!\!\!\text{-}I + Mg \xrightarrow{(C_6H_5)_2PCl} (C_6H_5)_2PC_6H_4P(C_6H_5)_2$ Obviously many modifications and variations of the present invention are possible in the light of the above teachings. It is therefore to be understood that within the scope of the appended claim the invention may be practiced otherwise than as specifically described.

What is claimed is:

The compounds 1,4-bis(diphenylphosphino)benzene.

No references cited.